United States Patent
Xu

(10) Patent No.: US 9,436,025 B2
(45) Date of Patent: Sep. 6, 2016

(54) METHOD AND DEVICE OF LIQUID CRYSTAL PHOTO-ALIGNMENT

(75) Inventor: Liang Xu, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 537 days.

(21) Appl. No.: 13/641,110

(22) PCT Filed: May 17, 2012

(86) PCT No.: PCT/CN2012/075634
§ 371 (c)(1),
(2), (4) Date: Oct. 13, 2012

(87) PCT Pub. No.: WO2013/159413
PCT Pub. Date: Oct. 31, 2013

(65) Prior Publication Data
US 2013/0286343 A1    Oct. 31, 2013

(30) Foreign Application Priority Data
Apr. 28, 2012 (CN) .......................... 2012 1 0132839

(51) Int. Cl.
*G02F 1/1333* (2006.01)
*G02F 1/1337* (2006.01)
*G02F 1/137* (2006.01)

(52) U.S. Cl.
CPC ....... *G02F 1/1333* (2013.01); *G02F 1/133788* (2013.01); *G02F 2001/13775* (2013.01)

(58) Field of Classification Search
CPC ................. G02F 1/1333; G02F 1/133; G02F 1/133788; G02F 2001/13775
See application file for complete search history.

(56) References Cited

U.S. PATENT DOCUMENTS

2005/0136196 A1* 6/2005 Kataoka .......................... 428/1.1

FOREIGN PATENT DOCUMENTS

CN    102402069 A    4/2012
TW    200532297 A    3/2014

OTHER PUBLICATIONS

Zhao et al., machine English translation of CN 102402069; pub Apr. 4, 2012.*

* cited by examiner

*Primary Examiner* — Michael Pepitone
(74) *Attorney, Agent, or Firm* — Andrew C. Cheng

(57) ABSTRACT

The present invention provides a method and device of liquid crystal photo-alignment. The method comprises: providing a liquid crystal layer, liquid crystal layer doped with reactive monomer; under influence of an electric field, using radiation light to irradiate on liquid crystal layer to trigger polymerization of monomers to achieve the photo-alignment of liquid crystal layer; wherein polymerization of monomers comprising a first stage and a second stage following the first stage, the radiation light having a first illumination in the first stage and having a second illumination in the second stage, and the first illumination being less than the second illumination. The method and device of liquid crystal photo-alignment of the present invention improves the stability and uniformity of the photo-alignment of the liquid crystal, and satisfy the photo-alignment reaction speed as well as effectively avoid the light leakage caused by macromolecular effect.

9 Claims, 6 Drawing Sheets

_(1)_

METHOD AND DEVICE OF LIQUID CRYSTAL PHOTO-ALIGNMENT

BACKGROUND OF THE INVENTION

1. Field of the Invention

The present invention relates to the field of liquid crystal displaying techniques, and in particular to a method and device of liquid crystal photo-alignment.

2. The Related Arts

As displaying techniques undergo fast development, different types of displays are developed and marketed. The currently available panel display devices include liquid crystal display device (LCD), plasma display panel (PDP), organic light-emitting diode (OLED) display device, and so on. Among these, the liquid crystal display device has the advantages of light weight, small size and low energy consumption, and is widely applied to many fields.

Polymer sustained vertical alignment (PSVA) mode liquid crystal panel is already widely used in liquid crystal display device. The electrode structure of the PSVA mode liquid crystal panel is shown in FIG. 1a. FIG. 1b shows a schematic cross-sectional view along A-A' line of power-off state of the electrode structure of the PSVA mode liquid crystal panel of FIG. 1a, and FIG. 1c shows a schematic cross-sectional view along A-A' line of power-on state of the electrode structure of the PSVA mode liquid crystal panel of FIG. 1a. The PSVA mode liquid crystal panel is to add reactive monomer 16 to negative liquid crystal molecules 15 to achieve the photo-alignment of negative liquid crystal molecules 15. In this displaying technique, transparent conductive layers 13, 14 on substrate 11, 12 are neither disposed with bumps nor openings to save the manufacture cost and improve the transmittance of the liquid crystal panel.

In PSVA displaying technique or other displaying techniques requiring photo-alignment, a voltage is applied to the two ends of the liquid crystal cell and UV is applied to excite, the reactive monomer polymerize so as to achieve the photo-alignment of the liquid crystal layer. Throughout the entire process, the UV is uninterruptedly applied to the liquid crystal layer.

According to the polymerization theory, the above reaction process is a UV-excited free-radical polymerization, which includes three steps: chain initiation, chain propagation, and chain termination.

Based on the chemical reaction kinetics, the initiation rate Ri of the chain initiation can be deduced as:

$$Ri = \phi \epsilon I_0 [M] \quad \text{(equ. 1-1)}$$

Where Ri is the initiation rate of the chain initiation, $\phi$ is the photon excitation efficiency, indicating the number of photons required to excite an active free-radical, $\epsilon$ is the molar extinction coefficient of the reactive monomer to UV light, and $I_0$ is the incident light illumination, and $[M]$ is the reactive monomer concentration.

Based on the chemical reaction kinetics, the chain propagation rate Rp can be deduced as:

$$Rp = k_p \left(\frac{\phi \epsilon I_0}{k_t}\right)^{3/2} [M] \quad \text{(equ. 1-2)}$$

Where Rp is the chain propagation rate, kp is chain propagation rate constant and kt is the chain termination rate constant.

The chain termination reaction includes coupling termination and disproportionation termination, where coupling termination is the coupling of free-radicals, that is, two active free-radicals are coupled through covalent bond to form inactive saturated molecule; and disproportionation termination is the exchange of electrons or hydrogen atom between two free-radicals, but the two still remain two molecules albeit inactive. These two termination reactions are different, but both reactions between free-radicals.

Because free-radical is a highly active reaction trigger, the photo-triggered free-radical polymerization shows the characteristics of slow initiation, rapid propagation and rapid termination. Based on equ. 1-1 and equ. 1-2, the corresponding kinetic chain length v can be deduced as:

$$v = \frac{Rp}{Ri} = \frac{k_p}{(\phi \epsilon I_0 k_t)^{1/2}} [M]^{1/2} \quad \text{(equ. 1-3)}$$

The deduction of the above equation is based on a stable system, and without taking the container wall, such as, the substrates on both sides of the liquid crystal, into account.

However, in the known PSVA displaying technique, substrates are placed on both sides of liquid crystal, and the UV light is continuously applied at a constant illumination to perform photo-alignment on the liquid crystal, which results in the insufficient stability and uniformity of the liquid crystal photo-alignment and leading to macromolecular effect and light leakage.

Thus, it is desired to have a method and device of liquid crystal photo-alignment to improve the stability and uniformity of photo-alignment of liquid crystal.

SUMMARY OF THE INVENTION

The technical issue to be addressed by the present invention is to provide a method and device of liquid crystal photo-alignment, which provides improved stability and uniformity of photo-alignment of liquid crystal.

The present invention provides a method of liquid crystal photo-alignment, which comprises: providing a liquid crystal layer, the liquid crystal layer doped with reactive monomer; under influence of an electric field, using radiation light to irradiate on the liquid crystal layer so as to trigger polymerization of monomers to achieve the photo-alignment of the liquid crystal layer; wherein the polymerization of monomers comprising a first stage and a second stage following the first stage, the radiation light having a first illumination in the first stage and having a second illumination in the second stage, and the first illumination being less than the second illumination.

According to a preferred embodiment of the present invention, the reactive monomer has a first concentration at the beginning of the first stage and has a second concentration at the beginning of the second stage, wherein the second concentration is $e^{-1/2}$ times of the first concentration, and the second illumination is $e^{-1/2}$ times of the first illumination.

According to a preferred embodiment of the present invention, the pulse width and/or pulse frequency of the radiation light in the first stage and the second stage are controlled to make the first illumination less than the second illumination.

According to a preferred embodiment of the present invention, the radiation light has a first photon excitation efficiency and a first molar extinction coefficient with respect to the reactive monomer in the first stage, and has a second photon excitation efficiency and a second molar extinction coefficient with respect to the reactive monomer in the second stage; wherein the first photon excitation efficiency is less than the second photon excitation efficiency, and the first molar extinction coefficient is less than the second molar extinction coefficient.

According to a preferred embodiment of the present invention, the wavelength of radiation light in the first stage and the second stage is controlled so that the first photon excitation efficiency is less than the second photon excitation efficiency, and the first molar extinction coefficient is less than the second molar extinction coefficient.

According to a preferred embodiment of the present invention, the polymerization of reactive monomers further comprises a third stage following the second stage; wherein the radiation light has a third illumination in the third stage, and the second illumination is less than the third illumination.

According to a preferred embodiment of the present invention, the radiation light irradiates in an uninterrupted manner on the liquid crystal in the third stage.

According to a preferred embodiment of the present invention, the radiation light has a first photon excitation efficiency and a first molar extinction coefficient with respect to the reactive monomer in the first stage, has a second photon excitation efficiency and a second molar extinction coefficient with respect to the reactive monomer in the second stage, and has a third photon excitation efficiency and a third molar extinction coefficient with respect to the reactive monomer in the third stage; wherein the first photon excitation efficiency is less than the second photon excitation efficiency, the second photon excitation efficiency is less than the third photon excitation efficiency, the first molar extinction coefficient is less than the second molar extinction coefficient, and the second molar extinction coefficient is less than the third molar extinction coefficient.

The present invention provides a device of liquid crystal photo-alignment, which comprises: electric field generator, for generating an electric field; a radiation light generator, for generating a radiation light, so that reactive monomers doped in liquid crystal layer being triggered by the electric field and radiation light to polymerize to achieve photo-alignment of liquid crystal layer; wherein polymerization of monomers comprising a first stage and a second stage following the first stage, the radiation light generator making the radiation light with a first illumination in the first stage and with a second illumination in the second stage, and the first illumination being less than the second illumination.

According to a preferred embodiment of the present invention, the polymerization of reactive monomers further comprises a third stage following the second stage; wherein the radiation light generator makes the radiation light with a third illumination in the third stage, and the second illumination is less than the third illumination.

According to a preferred embodiment of the present invention, the radiation light generator makes the radiation light irradiate in an uninterrupted manner on the liquid crystal in the third stage.

According to a preferred embodiment of the present invention, the second illumination is $e^{-1/2}$ times of the first illumination.

According to a preferred embodiment of the present invention, the radiation light generator makes the pulse width and/or pulse frequency of the radiation light in the first stage and the second stage are controlled to make the first illumination less than the second illumination.

The present invention provides a method of liquid crystal photo-alignment, which comprises: providing a liquid crystal layer, the liquid crystal layer doped with reactive monomer; under influence of an electric field, using radiation light to irradiate on the liquid crystal layer so as to trigger polymerization of monomers to achieve the photo-alignment of the liquid crystal layer; wherein the polymerization of monomers comprising a first stage and a second stage following the first stage, the reactive monomer having a first concentration at the beginning of the first stage and having a second concentration at the beginning of the second stage, and the second concentration is $e^{-1/2}$ times of the first concentration; the radiation light having a first illumination in the first stage and having a second illumination in the second stage, and pulse width and/or pulse frequency of the radiation light in the first stage and the second stage being controlled to make the first illumination less than the second illumination.

According to a preferred embodiment of the present invention, the second illumination is $e^{-1/2}$ times of the first illumination.

According to a preferred embodiment of the present invention, the radiation light has a first photon excitation efficiency and a first molar extinction coefficient with respect to the reactive monomer in the first stage, and has a second photon excitation efficiency and a second molar extinction coefficient with respect to the reactive monomer in the second stage; wherein the first photon excitation efficiency is less than the second photon excitation efficiency, and the first molar extinction coefficient is less than the second molar extinction coefficient.

According to a preferred embodiment of the present invention, the wavelength of radiation light in the first stage and the second stage is controlled so that the first photon excitation efficiency is less than the second photon excitation efficiency, and the first molar extinction coefficient is less than the second molar extinction coefficient.

According to a preferred embodiment of the present invention, the polymerization of reactive monomers further comprises a third stage following the second stage; wherein the radiation light has a third illumination in the third stage, and the second illumination is less than the third illumination.

According to a preferred embodiment of the present invention, the radiation light irradiates in an uninterrupted manner on the liquid crystal in the third stage.

According to a preferred embodiment of the present invention, the radiation light has a first photon excitation efficiency and a first molar extinction coefficient with respect to the reactive monomer in the first stage, has a second photon excitation efficiency and a second molar extinction coefficient with respect to the reactive monomer in the second stage, and has a third photon excitation efficiency and a third molar extinction coefficient with respect to the reactive monomer in the third stage; wherein the first photon excitation efficiency is less than the second photon excitation efficiency, the second photon excitation efficiency is less than the third photon excitation efficiency, the first molar extinction coefficient is less than the second molar extinction coefficient, and the second molar extinction coefficient is less than the third molar extinction coefficient.

The efficacy of the present invention is that to be distinguished from the state of the art. The method and device of liquid crystal photo-alignment according to the present invention improves the stability and uniformity of the photo-alignment of the liquid crystal, and meet the photo-alignment reaction speed as well as effectively avoid the light leakage caused by macromolecular effect so as to achieve the rapid and high quality photo-alignment of liquid crystal to provide improved mass productivity.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

FIG. 1b is a cross-sectional view along the A-A' direction of the liquid crystal display device in inactive state shown in FIG. 1a;

FIG. 1c is a cross-sectional view along the A-A' direction of the liquid crystal display device in active state shown in FIG. 1a;

DETAILED DESCRIPTION OF THE PREFERRED EMBODIMENTS

Figure 1A:
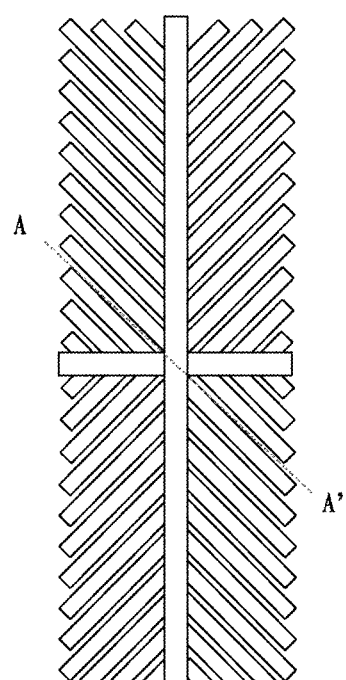
FIG. 1a is a schematic view showing the structure of transparent electrode of liquid crystal display device based on PSVA displaying technique.
Figure 1B:
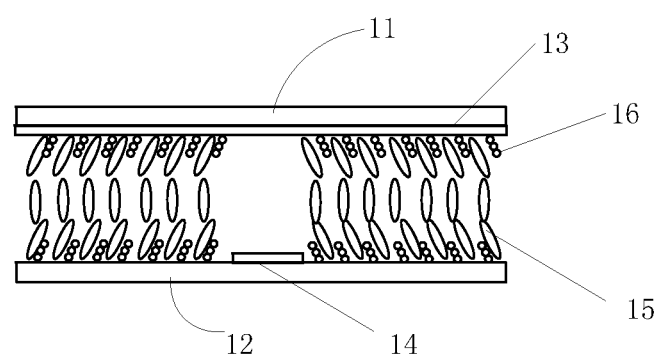
Figure 1C:
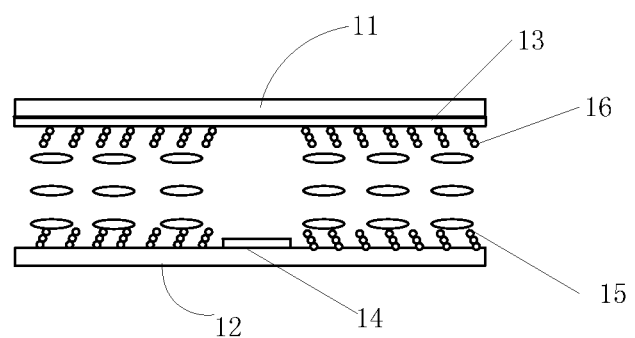

The following describes the present invention in details with referring to the drawings and the embodiments.

The method and device of liquid crystal photo-alignment of the present invention takes the actual conditions of the liquid crystal cell into account to deduce the chemical reaction kinetic equations of the free-radical polymerization photo-triggered inside the liquid crystal cell. Based on the deduced equations, the present invention provides the solution of using dynamic pulse to realize the liquid-crystal photo-alignment.

Because the thickness of liquid crystal cell is about 4 μm, the photo-triggered free-radical chemical reaction kinetic equations of equ. 1-1, equ. 1-2, and equ. 1-3 are not applicable to such a reaction system. The reasons are:
(1) The chain termination reaction occurring in the liquid crystal cell is not only coupling termination and disproportionation termination, but also the free-radical annihilation caused by effective collision between the free-radical and the upper and lower substrates;
(2) Inside the liquid crystal cell, because the concentration of the reactive monomer is low, the concentration of the generated free-radical is also low when long wavelength and low illumination UV light is applied; the coupling termination and disproportionation termination can be ignored, but the reaction speed will be reduced;
(3) In the liquid crystal cell, although the concentration of the reactive monomer is low, the concentration of the generated free-radical is higher when short wavelength and high illumination UV light is applied; under such circumstances, the coupling termination and disproportionation termination cannot be ignored; and
(4) In the liquid crystal cell, if more coupling termination occurs during the photo-alignment process, macromolecules will be generated to cause the problems of light scattering, leakage and reduced contrast.

Based on the above analysis, the initiation rate Ri of the chain initiation inside the liquid crystal cell can be deduced as:

$$Ri = \phi \epsilon I_0 [M] \qquad \text{(equ. 2-1)}$$

Where Ri is the initiation rate of the chain initiation, $\phi$ is the photon excitation efficiency, indicating the number of photons required to excite an active free-radical, $\epsilon$ is the molar extinction coefficient of the reactive monomer to UV light, and $I_0$ is the incident light illumination, and [M] is the reactive monomer concentration.

When long wavelength and low illumination UV is applied, the steady state free-radical concentration [M1] is:

$$[M1] = \frac{Ri}{k_t} \qquad \text{(equ. 2-2)}$$

And the chain propagation rate Rp is:

$$Rp = k_p \left(\frac{\phi \epsilon I_0}{k_t}\right)[M]^2 \qquad \text{(equ. 2-3)}$$

Where kp is chain propagation rate constant and kt is the chain termination rate constant.

Based on the above reaction rate equations in equ. 2-1 and equ. 2-3, the corresponding kinetic chain length ν can be deduced as:

$$\nu = \frac{Rp}{Ri} = \frac{k_p}{k_t}[M] \qquad \text{(equ. 2-4)}$$

Based on equ. 2-4, the kinetic chain length ν of photon-triggered free-radical polymerization inside the liquid crystal cell is only related to the concentration of reactive monomer under the moderate conditions (i.e., long wavelength and low illumination). The kinetic chain length has a larger impact on the stability of the liquid crystal orientation.

In addition, the ratio of the coupling termination reaction in the total termination reaction can be deduced as:

$$\alpha \propto Ri = \phi \epsilon I_0 [M] \qquad \text{(equ. 2-5)}$$

The following contradictions can be observed:
(1) To increase the alignment speed, the chain propagation rate Rp must be raised, that is, illumination or reactive monomer concentration must be increased;
(2) To obtain appropriate kinetic chain length, the concentration of the reactive monomer is only allowed within a small range, and no large range change is allowed; and
(3) To reduce the ratio of coupling termination reaction, the illumination or reactive monomer concentration must be decreased.

The present invention realizes the above three requirements of photo-alignment through applying dynamic pulse to liquid crystal layer.

Figure 2:
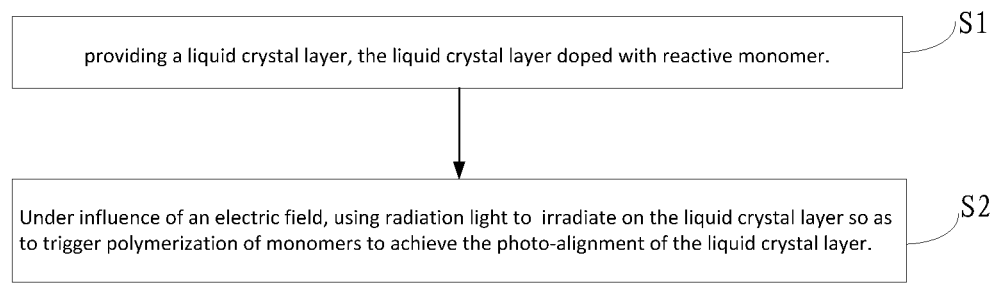
FIG. 2 is a flowchart of a method of liquid crystal photo-alignment according to the present invention.

FIG. 2 shows a flowchart of the method of liquid crystal photo-alignment of the present invention. As shown in FIG. 2, a preferred embodiment of the method comprises the steps of:

Step S1: providing a liquid crystal layer, the liquid crystal layer doped with reactive monomer.

The liquid crystal layer can be negative liquid crystal material of known technique. The reactive monomer can be reactive monomer of known technique able to polymerize when applying radiation light to achieve liquid crystal photo-alignment.

Step S2: under influence of an electric field, using radiation light to irradiate on the liquid crystal layer so as to trigger polymerization of monomers to achieve the photo-alignment of the liquid crystal layer.

The above polymerization of monomers comprises a first stage and a second stage following the first stage. The radiation light has a first illumination in the first stage and has a second illumination in the second stage, and the first illumination is less than the second illumination.

Furthermore, the polymerization of monomers can comprise a third stage, following the second stage. In the instant embodiment, the radiation light has a third illumination in the third stage, and the third illumination is higher than the second illumination.

In the first stage (i.e., the initial stage) of the reaction, because the concentration of the reactive monomer is higher, the coupling termination is easy to occur. Therefore, this stage applies a low illumination to irradiate on the liquid crystal layer. The low illumination can be realized by using a shorter and less radiation pulse, specifically, as shown in first stage T1 of FIG. 3.

In the second stage (i.e., the middle stage) of the reaction, the concentration of the reactive monomer is reduced and the probability of coupling termination is decreased. However, because the concentration of the reactive monomer is reduced, the reaction speed is also reduced. To ensure a certain reaction speed, this stage applies a high illumination to irradiate on the liquid crystal layer. The high illumination can be realized by using a longer and more radiation pulse, specifically, as shown in second stage T2 of FIG. 3.

In the instant embodiment, the concentration of the reactive monomer is the first concentration in the first stage, and the second concentration in the second stage. Preferably, the division of the first stage and the second stage of the reaction is when kinetic chain length becoming 1/e. Therefore, the second concentration is defined as $e^{-1/2}$ times of the first concentration. In this manner, when reactive monomer concentration [M1] becomes $e^{-1/2}$ times of the first concentration, the illumination must be changed to enter the second stage. The second illumination of the second stage is changed to $e^{-1/2}$ times of the first illumination of the first stage.

In the third stage (i.e., the subsequent stage) of the reaction, the concentration of the reactive monomer is further reduced, and the probability of coupling termination reaction is very low. To ensure reaction speed, this stage applies a even higher illumination to irradiate on the liquid crystal layer in an uninterrupted manner. Specifically, the even higher illumination is as shown in third stage T3 of FIG. 3. The division of the second stage and the third stage can be obtained through experiments.

Figure 3:
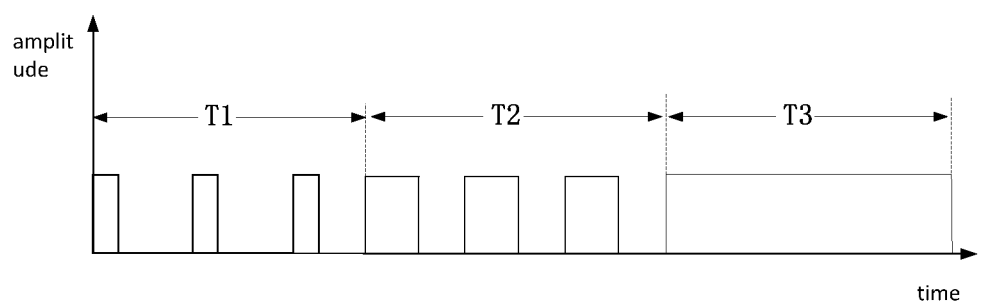
FIG. 3 is a schematic view showing the timing diagram of the radiation light in the method of liquid crystal photo-alignment according to the present invention.

In FIG. 3, the illumination at different stages can be controlled through controlling the pulse width of the radiation light. However, the illumination at different stages can be controlled through controlling the pulse frequency of the radiation light, or through controlling both the pulse width and the pulse frequency of the radiation light. Obviously, other means to control the illumination at different stages can also be devised by those skilled in this filed, and the descriptions is omitted here.

As seen in equ. 2-5, the ratio of coupling termination reaction in total termination reaction is related to the photon excitation efficiency $\phi$ and molar extinction coefficient $\epsilon$. Therefore, the present invention applies a radiation light having a lower photon excitation efficiency $\phi$ and molar extinction coefficient $\epsilon$ with respect to the reactive monomer in the initial stage, and as the reaction proceeds to later stages, radiation light having a higher photon excitation efficiency $\phi$ and molar extinction coefficient $\epsilon$ with respect to the reactive monomer is applied.

Specifically, the radiation light has a first photon excitation efficiency and a first molar extinction coefficient with respect to the reactive monomer in the first stage, has a second photon excitation efficiency and a second molar extinction coefficient with respect to the reactive monomer in the second stage, and has a third photon excitation efficiency and a third molar extinction coefficient with respect to the reactive monomer in the third stage. The first photon excitation efficiency is less than the second photon excitation efficiency, the second photon excitation efficiency is less than the third photon excitation efficiency, the first molar extinction coefficient is less than the second molar extinction coefficient, and the second molar extinction coefficient is less than the third molar extinction coefficient. Specifically, through using radiation light having different wavelength or different frequency during the first stage, the second stage and the third stage, the first photon excitation efficiency can be made less than the second photon excitation efficiency, the second photon excitation efficiency can be made less than the third photon excitation efficiency, the first molar extinction coefficient can be made less than the second molar extinction coefficient, and the second molar extinction coefficient can be made less than the third molar extinction coefficient.

In the present embodiment, in addition to applying UV light for photo-alignment of liquid crystal, radiation light of other known techniques can also applied to perform the same.

Figure 4:
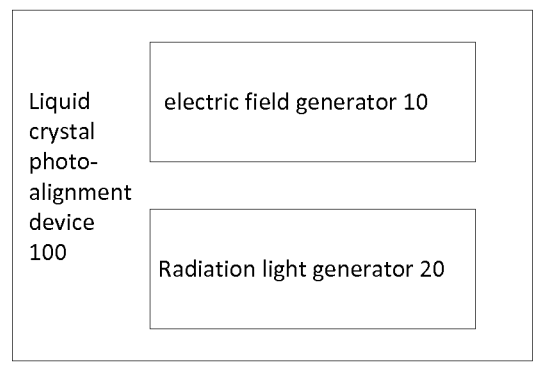
FIG. 4 is a schematic view showing the structure of a device of liquid crystal photo-alignment according to the present invention.

FIG. 4 shows a device of liquid crystal photo-alignment according to the present invention. As shown in FIG. 4, a liquid crystal photo-alignment device 100 comprises an electric filed generator 10 and a radiation light generator 20.

In the instant embodiment, electric field generator 10 to generate an electric field.

Radiation light generator 20 is for generating a radiation light so that the reactive monomer doped in the liquid crystal layer will polymerize under the influence of electric field and the radiation light to achieve the liquid crystal photo-alignment. In the instant embodiment, radiation light generator 20 following the above description to generate different radiation light for different polymerization stage to achieve the above objective, and the description will not repeated here.

In summary, the present invention changes the total illumination through applying different pulse during different reaction stages to satisfy the reaction speed and avoid the light leakage caused by macromolecular effect so as to achieve the rapid and high quality photo-alignment of liquid crystal.

To distinguish from the known techniques, the method and device of liquid crystal photo-alignment according to the present invention improves the stability and uniformity of the photo-alignment of the liquid crystal, and satisfy the photo-alignment reaction speed as well as effectively avoid the light leakage caused by macromolecular effect so as to achieve the rapid and high quality photo-alignment of liquid crystal to provide improved mass productivity.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A method of liquid crystal photo-alignment, which comprises the steps of:
   providing a liquid crystal layer, the liquid crystal layer doped with reactive monomer; and
   under influence of an electric field, using radiation light to irradiate on the liquid crystal layer so as to trigger polymerization of monomers to achieve the photo-alignment of the liquid crystal layer; wherein the polymerization of monomers comprising a first stage and a second stage following the first stage, the radiation light having a first illumination in the first stage and having a second illumination in the second stage, and the first illumination being less than the second illumination,
   wherein the reactive monomer has a first concentration at the beginning of the first stage and has a second concentration at the beginning of the second stage,
   wherein the second concentration is $e^{-1/2}$ times of the first concentration, and the second illumination is $e^{-1/2}$ times of the first illumination,
   wherein the polymerization of reactive monomers further comprises a third stage following the second stage;
   wherein the radiation light has a third illumination in the third stage, the second illumination is less than the third illumination, and the radiation light irradiates in an uninterrupted manner on the liquid crystal in the third stage.

2. The method of liquid crystal photo-alignment as claimed in claim 1, characterized in that the radiation light has a first photon excitation efficiency and a first molar extinction coefficient with respect to the reactive monomer in the first stage, and has a second photon excitation efficiency and a second molar extinction coefficient with respect to the reactive monomer in the second stage; wherein the first photon excitation efficiency is less than the second photon excitation efficiency, and the first molar extinction coefficient is less than the second molar extinction coefficient.

3. The method of liquid crystal photo-alignment as claimed in claim 2, characterized in that the wavelength of radiation light in the first stage and the second stage is controlled so that the first photon excitation efficiency is less than the second photon excitation efficiency, and the first molar extinction coefficient is less than the second molar extinction coefficient.

4. The method of liquid crystal photo-alignment as claimed in claim 1, characterized in that the radiation light has a first photon excitation efficiency and a first molar extinction coefficient with respect to the reactive monomer in the first stage, has a second photon excitation efficiency and a second molar extinction coefficient with respect to the reactive monomer in the second stage, and has a third photon excitation efficiency and a third molar extinction coefficient with respect to the reactive monomer in the third stage; wherein the first photon excitation efficiency is less than the second photon excitation efficiency, the second photon excitation efficiency is less than the third photon excitation efficiency, the first molar extinction coefficient is less than the second molar extinction coefficient, and the second molar extinction coefficient is less than the third molar extinction coefficient.

5. A method of liquid crystal photo-alignment, which comprises the steps of:
   providing a liquid crystal layer, the liquid crystal layer doped with reactive monomer; and
   under influence of an electric field, using radiation light to irradiate on the liquid crystal layer so as to trigger polymerization of monomers to achieve the photo-alignment of the liquid crystal layer; wherein the polymerization of monomers comprising a first stage and a second stage following the first stage, the reactive monomer having a first concentration at the beginning of the first stage and having a second concentration at the beginning of the second stage, and the second concentration is $e^{-1/2}$ times of the first concentration; the radiation light having a first illumination in the first stage and having a second illumination in the second stage, and pulse width and/or pulse frequency of the radiation light in the first stage and the second stage being controlled to make the first illumination less than the second illumination,
   wherein the polymerization of reactive monomers further comprises a third stage following the second stage;
   wherein the radiation light has a third illumination in the third stage, the second illumination is less than the third illumination, and the radiation light irradiates in an uninterrupted manner on the liquid crystal in the third stage.

6. The method of liquid crystal photo-alignment as claimed in claim 5, characterized in that the second illumination is $e^{-1/2}$ times of the first illumination.

7. The method of liquid crystal photo-alignment as claimed in claim 5, characterized in that the radiation light has a first photon excitation efficiency and a first molar extinction coefficient with respect to the reactive monomer in the first stage, and has a second photon excitation efficiency and a second molar extinction coefficient with respect to the reactive monomer in the second stage; wherein the first photon excitation efficiency is less than the second photon excitation efficiency, and the first molar extinction coefficient is less than the second molar extinction coefficient.

8. The method of liquid crystal photo-alignment as claimed in claim 7, characterized in that the wavelength of radiation light in the first stage and the second stage is controlled so that the first photon excitation efficiency is less than the second photon excitation efficiency, and the first molar extinction coefficient is less than the second molar extinction coefficient.

9. The method of liquid crystal photo-alignment as claimed in claim 5, characterized in that the radiation light has a first photon excitation efficiency and a first molar extinction coefficient with respect to the reactive monomer in the first stage, has a second photon excitation efficiency and a second molar extinction coefficient with respect to the reactive monomer in the second stage, and has a third photon excitation efficiency and a third molar extinction coefficient with respect to the reactive monomer in the third stage; wherein the first photon excitation efficiency is less than the second photon excitation efficiency, the second photon excitation efficiency is less than the third photon excitation efficiency, the first molar extinction coefficient is less than the second molar extinction coefficient, and the second molar extinction coefficient is less than the third molar extinction coefficient.

\* \* \* \* \*